US009464391B2

United States Patent
Killion et al.

(10) Patent No.: US 9,464,391 B2
(45) Date of Patent: Oct. 11, 2016

(54) COLD PLANER HAVING INDEPENDENTLY CONTROLLED CONVEYORS

(71) Applicant: Caterpillar Paving Products Inc., Minneapolis, MN (US)

(72) Inventors: Daniel Harry Killion, Blaine, MN (US); Craig Martin Steffen, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 88 days.

(21) Appl. No.: 14/472,768

(22) Filed: Aug. 29, 2014

(65) Prior Publication Data

US 2016/0060828 A1 Mar. 3, 2016

(51) Int. Cl.
*E01C 23/088* (2006.01)
*E01C 23/12* (2006.01)
*B65G 43/10* (2006.01)

(52) U.S. Cl.
CPC ........... *E01C 23/127* (2013.01); *E01C 23/088* (2013.01); *B65G 43/10* (2013.01)

(58) Field of Classification Search
CPC ...... E01C 23/127; E21C 35/20; E21C 47/00; E21F 13/063
USPC ........................................................ 198/579
See application file for complete search history.

(56) References Cited

U.S. PATENT DOCUMENTS

| 5,318,378 | A | 6/1994 | Lent |
| 6,540,063 | B1 | 4/2003 | Fallas et al. |
| 6,733,086 | B1 | 5/2004 | McSharry et al. |
| 8,622,480 | B2 | 1/2014 | Weckerly et al. |
| 2011/0248654 | A1 | 10/2011 | Graner et al. |
| 2012/0301220 | A1 | 11/2012 | Snoeck et al. |
| 2013/0333664 | A1* | 12/2013 | Killion et al. ........... 123/339.16 |
| 2014/0015303 | A1 | 1/2014 | Denson et al. |
| 2014/0054949 | A1* | 2/2014 | Berning et al. ................ 299/1.9 |
| 2014/0286706 | A1* | 9/2014 | Klockner ........................ 404/90 |
| 2015/0218762 | A1* | 8/2015 | Berning et al. ....... E01C 23/088 |

FOREIGN PATENT DOCUMENTS

| CN | 103741575 | 4/2014 |
| EP | 0663473 | 2/1999 |

* cited by examiner

*Primary Examiner* — John Kreck
*Assistant Examiner* — Michael Goodwin
(74) *Attorney, Agent, or Firm* — Finnegan, Henderson, Farabow, Garrett & Dunner, LLP

(57) ABSTRACT

A conveyor system is disclosed for use with a cold planer having a milling drum. The conveyor system may have a primary conveyor configured to receive material from the milling drum, a first motor configured to drive the primary conveyor, a secondary conveyor configured to receive material from the primary conveyor, and a second motor configured to drive the primary conveyor. The conveyor system may also have a controller configured to selectively adjust a speed of the second motor independent of a speed of the first motor.

16 Claims, 2 Drawing Sheets

COLD PLANER HAVING INDEPENDENTLY CONTROLLED CONVEYORS

TECHNICAL FIELD

Figure 1:
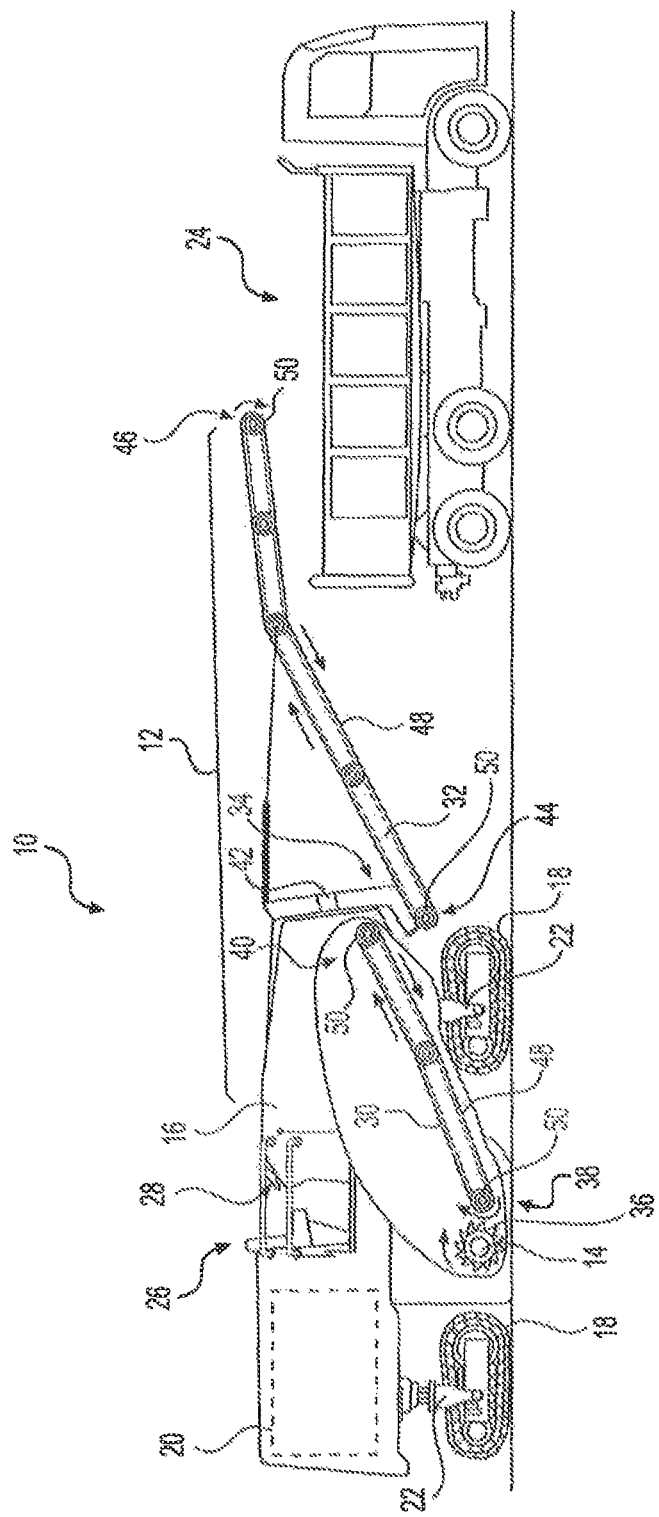

The present disclosure relates generally to a cold planer and, more particularly, to a cold planer having independently controlled conveyors.

BACKGROUND

Asphalt-surfaced roadways are built to facilitate vehicular travel. Depending upon usage density, base conditions, temperature variation, moisture variation, and/or physical age, the surface of the roadways eventually become misshapen, non-planar, unable to support wheel loads, or otherwise unsuitable for vehicular traffic. In order to rehabilitate the roadways for continued vehicular use, spent asphalt is removed in preparation for resurfacing.

Cold planers, sometimes also called road mills or scarifiers, are machines that typically include a frame propelled by tracked drive units. The frame supports an engine, an operator's station, and a milling drum. The milling drum, fitted with cutting tools, is rotated through a suitable interface by the engine to break up the surface of the roadway. The broken up roadway material is deposited by the milling drum onto a lower or primary conveyor for removal from the underside of the machine. The material is then transferred from the primary conveyor onto an upper or secondary conveyor, which transports the material away from the machine and over a nearby haul truck. The material travels up the secondary conveyor and falls off the end into the haul truck for transportation away from the jobsite. An exemplary cold planar having the above-described conveyor system is disclosed in U.S. Pat. No. 6,733,086 of McSharry et al. that issued on May 11, 2004.

In typical cold planers, a speed of the conveyors is controlled manually from inside an operator station. In particular, the primary and secondary conveyors are powered by hydraulic motors that are connected in series to a common pump. And based on operator input, a displacement of the common pump is adjusted. This displacement results in a greater or lesser flow rate of fluid passing through the motors and a corresponding speed increase or decrease in the primary and secondary conveyors.

While effective in some applications, the conveyor system of conventional cold planers may be problematic in other applications. Specifically, there may be situations where the operator desires to change the speed of the secondary conveyor independently from the speed of the primary conveyor. For example, a faster or slower material feed rate from the secondary conveyor into the haul truck may improve truck loading. However, the same change in the speed of the primary conveyor could cause material removal problems, material transfer problems, low efficiency, and/or excessive belt wear.

The conveyor system and cold planer of the present disclosure solve one or more of the problems set forth above and/or other problems in the art.

SUMMARY

In one aspect, the present disclosure may be related to a conveyor system for a cold planer having a milling drum. The conveyor system may include a primary conveyor configured to receive material from the milling drum, a first motor configured to drive the primary conveyor, a secondary conveyor configured to receive material from the primary conveyor, and a second motor configured to drive the primary conveyor. The conveyor system may also include a configured to selectively adjust a speed of the second motor independent of a speed of the first motor.

In another aspect, the present disclosure may be related to a method of operating a cold planer. The method may include driving a primary conveyor to transport material away from a milling drum, and driving a secondary conveyor to transport material away from the primary conveyor. The method may also include selectively adjusting a speed of the secondary conveyor independent of a speed of the primary conveyor.

In yet another aspect, the present disclosure is directed to a cold planer. The cold planer may include a frame, a plurality of traction devices connected to the frame and configured to propel the cold planer, and an engine supported by the frame and configure to drive the plurality of traction devices. The cold planer may also include an operator station connected to the frame, and a milling drum connected to the frame at a side opposite the milling drum. The cold planer may further include a primary conveyor configured to transport material away from the milling drum and having a first pump driven by the engine and a first motor driven by the first pump, a secondary conveyor configured to transport material away from the first conveyor and having a second pump driven by the engine and a second motor driven by the second pump, and a first operator input device located in the operator station and configured to generate a first signal indicative of a desired speed of the secondary conveyor. The cold planer may additionally include a controller configured to automatically adjust a first speed of the primary conveyor based on an operating characteristic of the milling drum, and to selectively adjust a second speed of the secondary conveyor independent of the first speed and based on the first signal.

BRIEF DESCRIPTION OF THE DRAIN

Figure 2:
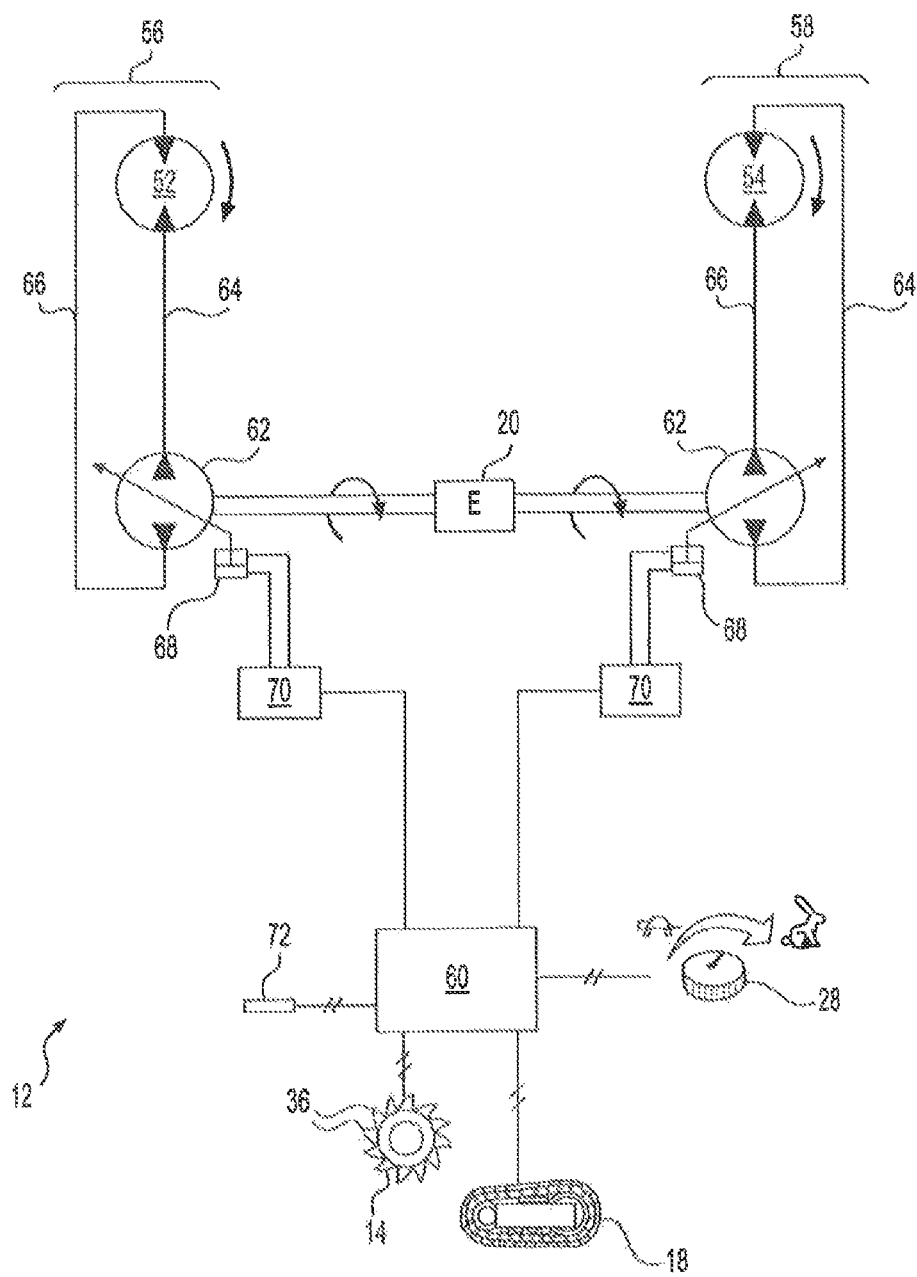

FIG. 1 is a cutaway view illustration of an exemplary disclosed cold planer; and FIG. 2 is a diagrammatic illustration of an exemplary disclosed conveyor system that may be used in conjunction with the cold planer of FIG. 1.

DETAILED DESCRIPTION

For the purpose of this disclosure, the term "asphalt" may be defined as a mixture of aggregate and asphalt cement. Asphalt cement may be a brownish-black solid or semi-solid mixture of bitumens obtained as a byproduct of petroleum distillation. The asphalt cement may be heated and mixed with the aggregate for use in paving roadway surfaces, where the mixture hardens upon cooling. A "cold planer" may be defined as a machine used to remove layers of hardened asphalt from an existing roadway. It is contemplated that the disclosed cold planer may also or alternatively be used to remove cement and other roadway surfaces.

FIG. 1 illustrates an exemplary cold planer 10 having a conveyor system 12 associated with a milling drum 14. Cold planer 10 may include a frame 16 supported by one or more traction devices 18, and a frame-mounted engine 20 configured to drive conveyor system 12, milling drum 14, and traction devices 18. Traction devices 18 may include either wheels or tracks connected to lifting columns 22 that are adapted to controllably raise and lower frame 16 (and milling drum 14) relative to a ground surface. Conveyor system 12 may be connected at a leading end to frame 16 and configured to transport material away from milling drum 14 and into a waiting haul vehicle 24.

Frame 16 may also support an operator station 26 having one or more input devices 28 used to control cold planer 10. In the disclosed example, input devices 28 include, among other things, a conveyor input device associated with conveyor system 12, a milling drum input device, and a travel input device. The conveyor input device may be configured to receive input from an operator regarding a desired speed and/or direction of conveyor system 12, and to generate a corresponding signal. The milling drum input device may be configured to receive input from the operator regarding a desired height (i.e., depth into the work surface) of milling drum 14, a desired rotational speed, a desired rotational torque, a type of material to be broken up by milling drum 14, etc., and to generate a corresponding signal. The travel input device may be configured to receive input from the operator regarding a desired travel speed or direction of cold planer 10, steering, acceleration, braking, etc. Other input devices may also be possible, and one or more of the input devices described above could be combined into a single input device (e.g., a touch screen monitor), if desired.

Conveyor system 12 may include various components that cooperate to remove broken up asphalt from milling drum 14. Specifically, conveyor system 12 may include a primary conveyor 30, a secondary conveyor 32, and a transition area 34 located between primary conveyor 30 and secondary conveyor 32. Cutting tools 36 connected to an outer periphery of milling drum 14 may be configured to deliver milled asphalt onto a charge end 38 of primary conveyor 30 as milling drum 14 rotates towards primary conveyor 30. As the milled asphalt exits a discharge end 40 of primary conveyor 30, the milled asphalt may strike against a weldment 42 located within transition area 34. Transition area 34 may be an enclosed box-like structure and, upon coming into forced contact with weldment 42, the milled asphalt may break apart and fall onto a charge end 44 of secondary conveyor 32. Secondary conveyor 32 may discharge the milled asphalt into haul vehicle 24 from a discharge end 46. In the disclosed embodiment, secondary conveyor 32 is capable of moving side-to-side and up-and-down to facilitate the discharge of milled asphalt into haul vehicle 24. It is contemplated, however, that secondary conveyor 32 could alternatively be fixed if desired.

Each of primary and secondary conveyors 30, 32 may include a belt 48 that is driven to rotate about spaced apart rollers 50 by an associated motor 52, 54, (shown only in FIG. 2). A rotational speed of motors 52, 54 may be adjustable so as to regulate a transport speed of the material carried by belts 48. In the disclosed embodiment, the transport speed of primary conveyor 30 may be automatically adjustable (via rotational speed adjustment of motor 52) based on one or more operational characteristics of cold planer 10 (e.g., engine speed, the travel speed, steering, milling drum depth, milling drum speed, milling drum torque, etc.), while the transport speed of secondary conveyor 32 may be independently and directly adjustable (via rotational speed adjustment of motor 54) based on operator input received from the conveyor input device 28.

As illustrated in FIG. 2, conveyor system 12 may include control elements that cooperate to regulate the speeds of primary and secondary conveyors 30, 32. These control elements may include primary and secondary hydraulic circuits 56, 58, respectively, and a controller 60 in communication with elements of each circuit. Controller 60, based on the different inputs described above, may be configured to regulate flows of pressurized fluid within circuits 56, 58 so as to selectively adjust the transport speeds of primary and secondary conveyors 30, 32.

Each of primary and secondary hydraulic circuits 56, 58 may include a dedicated engine-driven pump 62 that supplies high-pressure fluid to motors 52, 54. Each pump 62 may be connected to its associated motor via two passages 64, 66. During operation, one of passages 64, 66 will contain high-pressure fluid directed from pump 62 to the associated motor, while the other of passages 64, 66 will contain return fluid having a lower pressure. The particular passages containing the high- and low-pressure fluids will determine a rotational direction of the motors, while a flow rate of fluid within the two passages will affect a speed of each motor.

The flow rate of fluid within passages 64, 66 may be the result of a displacement of the associated pump 62. For example, a greater displacement of pump 62 may result in a greater fluid flow rate and an associated greater speed of motor 52 or 54. Similarly, a lesser displacement of pump 62 may result in a lower fluid flow rate and associated lower motor speed. The displacement of pump 62 may be varied by controller 60 via a displacement regulator 68 (e.g., a piston/swashplate configuration). In particular, controller 60 may affect a position of a valve 70 that regulates pilot fluid into displacement regulator 68 and return fluid out of displacement regulator 68. The pilot fluid flowing into displacement regulator 68 and the return fluid flowing out of displacement regulator 68 may create a directional force imbalance on displacement regulator 68 that causes displacement regulator 68 to move and change the displacement (i.e., the swashplate angle) of pump 62. Other types of displacement regulators may alternatively be utilized to adjust operation of pump 62, if desired.

Controller 60 may embody a single microprocessor or multiple microprocessors that include a means for monitoring operator input and operational characteristics of cold planer 10, and responsively adjusting the speeds of primary and secondary conveyors 30, 32. For example, controller 60 may include a memory, a secondary storage device, a clock, and a processor, such as a central processing unit or any other means for accomplishing a task consistent with the present disclosure. Numerous commercially available microprocessors can be configured to perform the functions of controller 60. It should be appreciated that controller 60 could readily embody a general machine controller capable of controlling numerous other machine functions. Various other known circuits may be associated with controller 60, including signal-conditioning circuitry, communication circuitry, and other appropriate circuitry. Controller 60 may be further communicatively coupled with an external computer system, instead of or in addition to including a computer system, as desired.

In some embodiments, controller 60 may rely on sensory information when regulating the speeds of primary and/or secondary conveyors 30, 32. For example, instead of or in addition to the signals generated by input devices 28, controller 60 may communicate with one or more sensors 72 to detect an actual rotational speed of milling drum 14, an actual depth, an engine speed, an actual travel speed, etc. Controller 60 may then automatically adjust a speed of primary and/or secondary conveyors 30, 32 based on the signals generated by sensor(s) 72.

INDUSTRIAL APPLICABILITY

The disclosed conveyor system may be used with any road material or cold planer where independent control of conveyor speeds is desired. The disclosed conveyor system may provide for independent control via separate hydraulic circuits, wherein one of the circuits is operator controllable and one of the circuits is automatically controlled. The operation of conveyor system 12 will now be explained.

As illustrated in FIG. 1, cold planer 10 may break up and remove asphalt with milling drum 14. As milling drum 14 rotates towards primary conveyor 30, cutting tools 36 may heap the milled asphalt onto primary conveyor 30. The milled asphalt on primary conveyor 30 may then be transported to and thrust against weldment 42 of transition area 34. As the milled asphalt strikes weldment 42, it may break down further and fall onto secondary conveyor 32. Secondary conveyor 32 may then transport the milled material to a location over haul vehicle 24.

The speed of primary conveyor 30 may be automatically controlled so as to transport material away from milling drum 14 in an efficient manner. In particular, for a given set of operating conditions, a single speed or a particular range of speeds may transport the material away from milling drum 14 in a low-energy consuming manner and in a manner that promotes continued effective operation of milling drum 14. Too slow of a speed could cause the material to build up within cold planer 14 at charge end 38 of primary conveyor 30, thereby increasing friction on milling drum 14 and/or blocking the discharge of new material. Too fast of a speed could cause material to fall off of belt 48 and/or consume more energy than is necessary. Accordingly, based on the different operating characteristics of cold planer 10, controller 60 may automatically determine and implement a desired speed to promotes continued efficient operation.

In some embodiments, controller 60 may receive the operating conditions from the operator via input devices 28. For example, the operator may be able to control the speed, direction, rotational torque, and/or depth of milling drum 14; and/or the travel direction and/or speed of cold planer 10. In addition, the operator may be able to input environmental parameters, such as the type of material being milled. And based on one or more of these different operating conditions provided to controller 60 by way of signals from input devices 28, controller 60 may be able to determine (e.g., from a look up table stored in memory) the desired speed of primary conveyor 30. In an alternative embodiment, controller 60 may itself automatically select and/or control the speed, direction, rotational torque, and/or depth of milling drum 14; and/or the travel direction and/or speed of cold planer 10.

In other embodiments, controller 60 may use the signals from sensor(s) 72 to determine the operating conditions. For example, controller 60, via sensor(s) 72, may sense actual values for the milling drum speed, torque, direction, depth; and the travel speed and direction. Controller 60 may then reference the signals from sensor(s) 72 with the look up tables to determine the desired speed of primary conveyor 30.

Once the desired speed of primary conveyor 30 has been determined, controller 60 may implement the desired speed by adjusting a displacement of pump 62 within primary hydraulic circuit 56. In particular, controller 60 may generate signals directed to valve 70, causing a desired movement of displacement regulator 68 that achieves a desired displacement of pump 62. The desired displacement should then create a flow rate of pressurized fluid passing through motor 52 that results in the desired speed of primary conveyor 30.

The speed of secondary conveyor 32 may be manually controlled independent of the primary conveyor speed, so as to transport material into haul vehicle 24 in a desired manner. In particular, the operator may manually manipulate input device 28 to directly affect the speed of secondary conveyor 32. For example, the operator may rotate a dial, move a lever, or otherwise input a desired speed between a low-speed limit and a high-speed limit. And controller 60 may implement a corresponding pump displacement change within secondary hydraulic circuit 58 that is directly related to the signal generated by input device 28. In this way, the operator may make adjustments to the speed of secondary conveyor 32 without affecting the speed of primary conveyor 32. This may be useful, for example, when haul trucks of different sizes, configurations, capacities, and/or travel speeds are used to receive the material from secondary conveyor 32. This may also be useful during a transition between haul vehicles, and/or during different phases of filling haul vehicle 24 (e.g., during high-rate filling and low-rate topping off).

By separating the control of secondary conveyor speed from primary conveyor speed, many benefits may be realized. For example, the speed of primary conveyor 30 may be optimized for material removal from milling drum 14, while the speed of secondary conveyor 32 may be optimized for material deposition inside haul vehicle 24. This may allow for efficient material movement, improved material transfer, and reduced component wear.

It will be apparent to those skilled in the art that various modifications and variations can be made to the disclosed conveyor system and cold planer without departing from the scope of the disclosure. Other embodiments of the conveyor system will be apparent to those skilled in the art from consideration of the specification and practice of the conveyor system disclosed herein. It is intended that the specification and examples be considered as exemplary only, with a true scope of the disclosure being indicated by the following claims and their equivalents.

What is claimed is:

1. A conveyor system for a cold planer having a milling drum, the conveyor system comprising:
    a primary conveyor configured and arranged to receive material from the milling drum;
    a first motor operatively coupled to the primary conveyor to drive the primary conveyor;
    a secondary conveyor configured and arranged to receive material from the primary conveyor;
    a second motor operatively coupled to the secondary conveyor to drive the secondary conveyor;
    an operator input device configured to generate a signal indicative of a target speed for the secondary conveyor; and
    a controller operatively coupled to the first motor, the second motor, and the operator input device, the controller being configured to
        automatically adjust a speed of the primary conveyor based on at least one operating characteristic of the cold planer, and
        selectively adjust a speed of the secondary conveyor independent of the speed of the primary conveyor and based on the signal from the operator input device.

2. The conveyor system of claim 1, wherein the first and second motors are hydraulic motors,
    the conveyor system further comprising:
    a first pump connected to power the first motor; and
    a second pump connected to power the second motor.

3. The conveyor system of claim 2, wherein the controller is further configured to selectively adjust a displacement of each of the first and second pumps.

4. The conveyor system of claim 1, wherein the at least one operating characteristic includes at least one of a speed of the milling drum, a depth of the milling drum, a configuration of the milling drum, a travel speed of the cold planer, a material being processed by the milling drum, and an engine speed.

5. The conveyor system of claim 4, wherein the operator input device is a first operator input device,
the signal is a first signal,
the conveyor system further comprises a second operator input device operatively coupled to the controller, the second operator input device being configured to generate a second signal indicative of a target value for the at least one operating characteristic, and
the controller is further configured to automatically adjust the speed of the primary conveyor based on the second signal.

6. The conveyor system of claim 4, wherein the signal is a first signal,
the conveyor system further comprises a sensor operatively coupled to the controller, the sensor being configured to generate a second signal indicative of a value corresponding to the at least one operating characteristic, and
the controller is further configured to automatically adjust the speed of the primary conveyor based on the second signal.

7. A method for operating a cold planer, the method comprising:
driving a primary conveyor to transport material away from a milling drum;
driving a secondary conveyor to transport material away from the primary conveyor;
automatically adjusting a speed of the primary conveyor based on at least one operating characteristic of the cold planer;
generating a signal from an operator input device that is indicative of a target speed for the secondary conveyor; and
selectively adjusting a speed of the secondary conveyor independent of the speed of the primary conveyor and based on the signal from the operator input device.

8. The method of claim 7, wherein selectively adjusting the speed of the secondary conveyor includes selectively adjusting a displacement of a first pump associated with the secondary conveyor independent of a displacement of a second pump associated with the primary conveyor.

9. The method of claim 7, wherein the at least one operating characteristic includes at least one of a milling drum speed, a milling drum depth, a milling drum configuration, a travel speed of the cold planer, a material being processed by the cold planer, and an engine speed.

10. The method of claim 9, further comprising receiving an operator input indicative of a target value for the at least one operating characteristic.

11. The method of claim 9, further comprising sensing the at least one operating characteristic.

12. A cold planer, comprising:
a frame;
a plurality of traction devices connected to the frame and configured to propel the cold planer;
an engine mounted to the frame and configure to drive the plurality of traction devices;
an operator station connected to the frame;
a milling drum connected to the frame;
a primary conveyor configured and arranged to transport material away from the milling drum and having a first pump driven by the engine and a first motor driven by the first pump;
a secondary conveyor configured and arranged to transport material away from the primary conveyor and having a second pump driven by the engine and a second motor driven by the second pump;
a first operator input device located in the operator station and configured to generate a first signal indicative of a target speed for the secondary conveyor; and
a controller operatively coupled to the first pump, the second pump, and the first operator input device, the controller being configured to:
automatically adjust a speed of the primary conveyor based on an operating characteristic of the milling drum; and
selectively adjust a speed of the secondary conveyor independent of the speed of the primary conveyor and based on the first signal.

13. The cold planer of claim 12, wherein the controller is further configured to selectively adjust the speed of the primary conveyor by adjusting a displacement of the first pump, and selectively adjust the speed of the secondary conveyor by adjusting a displacement of the second pump.

14. The cold planer of claim 13, further comprising a second operator input device operatively coupled to the controller, the second operator input device being configured to generate a second signal indicative of a desired value for the operating characteristic,
wherein the controller is further configured to automatically adjust the speed of the primary conveyor based on the second signal.

15. The cold planer of claim 13, further comprising a sensor operatively coupled to the controller, the sensor being configured to generate a second signal indicative of a value corresponding to the operating characteristic,
wherein the controller is further configured to automatically adjust the speed of the primary conveyor based on the second signal.

16. The cold planer of claim 12, wherein the controller is further configured to automatically adjust the speed of the primary conveyor based on at least one of a travel speed of the cold planer and a material being processed by the milling drum.

* * * * *